US012180838B2

(12) United States Patent
Barberger et al.

(10) Patent No.: US 12,180,838 B2
(45) Date of Patent: Dec. 31, 2024

(54) ROTOR ASSEMBLY WITH COOLING CHANNELS SEPARATED BY RIBS FOR A ROTARY ENGINE

(71) Applicant: Pratt & Whitney Canada Corp., Longueuil (CA)

(72) Inventors: Jérémie Barberger, Montreal (CA); Michel Bousquet, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/132,167

(22) Filed: Apr. 7, 2023

(65) Prior Publication Data

US 2024/0337186 A1 Oct. 10, 2024

(51) Int. Cl.

*F01C 21/06* (2006.01)
*F01C 1/22* (2006.01)
*F01C 19/00* (2006.01)
*F01C 19/12* (2006.01)
*F01C 21/00* (2006.01)
*F02B 53/00* (2006.01)

(52) U.S. Cl.

CPC ................ *F01C 21/06* (2013.01); *F01C 1/22* (2013.01); *F01C 19/00* (2013.01); *F01C 19/12* (2013.01); *F01C 21/007* (2013.01); *F02B 53/00* (2013.01); *F02B 2053/005* (2013.01)

(58) Field of Classification Search

CPC .. F01C 21/06; F01C 1/22; F01C 19/00; F01C 19/12; F01C 21/007; F02B 53/00; F02B 2053/005

See application file for complete search history.

(56) References Cited

U.S. PATENT DOCUMENTS 3,280,802 A 10/1966 Froede
3,695,790 A * 10/1972 Jones ...................... F01C 19/12 418/83
3,799,706 A 3/1974 Bilobran
4,021,163 A * 5/1977 Morita .................... F01C 21/06 418/152
4,531,900 A 7/1985 Jones
4,664,607 A * 5/1987 Jones ...................... F01C 21/06 418/83

(Continued)

FOREIGN PATENT DOCUMENTS

DE 102014017849 B4 3/2022
EP 3670833 A1 6/2020

OTHER PUBLICATIONS

EP search report for EP24169031.2 dated Oct. 29, 2024.

*Primary Examiner* — Mary A Davis
(74) *Attorney, Agent, or Firm* — Getz Balich LLC

(57) ABSTRACT

A rotor housing for an aircraft rotary engine includes a side housing body and a rail. The side housing body extends along an axis between and to an inner side and an outer side. The side housing body forms a fluid cooling passage and a plurality of ribs. The fluid cooling passage extends about the axis at the inner side. The plurality of ribs are coincident with and extend into the fluid cooling passage. The plurality of ribs are distributed about the fluid cooling passage as an array of ribs. The rail is disposed at the plurality of ribs. The rail extends about the fluid cooling passage. The side housing body and the rail form a plurality of fluid cooling channels connected in fluid communication with the fluid cooling passage.

18 Claims, 6 Drawing Sheets

(56) References Cited

U.S. PATENT DOCUMENTS

| | | | |
|---|---|---|---|
| 5,524,587 | A | 6/1996 | Mallen |
| 10,030,578 | B2 | 7/2018 | Gallatz |
| 2018/0141127 | A1 | 5/2018 | Richard |
| 2020/0200009 | A1 | 6/2020 | Gagnon-Martin |

* cited by examiner

ROTOR ASSEMBLY WITH COOLING CHANNELS SEPARATED BY RIBS FOR A ROTARY ENGINE

TECHNICAL FIELD

This disclosure relates generally to rotary engines for aircraft and, more particularly, to a rotor housing for a rotary engine.

BACKGROUND OF THE ART

A rotary engine for an aircraft may be configured, for example, as a Wankel engine. The rotary engine includes one or more rotors configured to eccentrically rotate within a rotor housing. Various rotor housing configurations are known for rotary engines. While these known rotor housings have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a rotor housing for an aircraft rotary engine includes a side housing body and a rail. The side housing body extends along an axis between and to an inner side and an outer side. The side housing body forms a fluid cooling passage and a plurality of ribs. The fluid cooling passage extends about the axis at the inner side. The plurality of ribs are coincident with and extend into the fluid cooling passage. The plurality of ribs are distributed about the fluid cooling passage as an array of ribs. The rail is disposed at the plurality of ribs. The rail extends about the fluid cooling passage. The side housing body and the rail form a plurality of fluid cooling channels connected in fluid communication with the fluid cooling passage.

In any of the aspects or embodiments described above and herein, each fluid cooling channel of the plurality of fluid cooling channels may include a channel inlet and the channel inlet may be disposed at the fluid cooling passage.

In any of the aspects or embodiments described above and herein, each fluid cooling channel of the plurality of fluid cooling channels may include a channel outlet and the channel outlet may be disposed at the inner side.

In any of the aspects or embodiments described above and herein, each fluid cooling channel of the plurality of fluid cooling channels may be formed by adjacent ribs of the plurality of ribs.

In any of the aspects or embodiments described above and herein, the side housing body may form an outer radial side, an inner radial side, and an outer axial side of the fluid cooling passage. The outer radial side and the inner radial side may extend between and to the inner side and the outer axial side.

In any of the aspects or embodiments described above and herein, each rib of the plurality of ribs may extend from the outer radial side into the fluid cooling passage.

In any of the aspects or embodiments described above and herein, the rail may include an axially-extending portion and a radially-extending portion. The axially-extending portion may extend from the radially-extending portion to the inner side.

In any of the aspects or embodiments described above and herein, the radially-extending portion may extend from the axially-extending portion to a distal end of each rib of the plurality of ribs.

According to another aspect of the present disclosure, a rotary engine assembly for an aircraft includes a rotatable engine shaft extending along a rotational axis, a rotor coupled to an eccentric portion of the rotatable engine shaft, and a rotor housing. The rotor housing surrounds and forms a rotor cavity for the rotor. The rotor housing includes a side housing body, a rail, and a side plate. The side housing body forms a fluid cooling passage and a plurality of ribs. The fluid cooling passage extending about the rotational axis. The plurality of ribs are coincident with and extend into the fluid cooling passage The rail is disposed at the plurality of ribs. The rail extends about the fluid cooling passage. The side plate includes an inner side, an outer side, and a perimeter edge. The perimeter edge is disposed at the rail. The inner side forms a portion of the rotor cavity.

In any of the aspects or embodiments described above and herein, the rotatable engine shaft may extend through the side housing body and the side plate along the rotational axis.

In any of the aspects or embodiments described above and herein, the rotor housing may further include a seal disposed between the rail and the side plate.

In any of the aspects or embodiments described above and herein, the outer side may further form the fluid cooling passage.

In any of the aspects or embodiments described above and herein, the side housing body and the rail may form a plurality of fluid cooling channels connected in fluid communication with the fluid cooling passage.

In any of the aspects or embodiments described above and herein, the side housing body and the rail may form a channel inlet and a channel outlet for each fluid cooling channel of the plurality of fluid cooling channels.

In any of the aspects or embodiments described above and herein, the rail may include an axially-extending portion and a radially-extending portion. The perimeter edge may be disposed at the axially-extending portion and the outer side may be disposed at the radially-extending portion.

According to another aspect of the present disclosure a rotor housing for an aircraft rotary engine includes a rotor housing body, a side housing body, a rail, and a side plate. The rotor housing body is disposed about an axis. The rotor housing body extends between and to a first axial end and a second axial end. The side housing body is disposed at the first axial end. The side housing body forms a first fluid cooling passage and a plurality of ribs. The first fluid cooling passage extends about the axis. The plurality of ribs are coincident with and extend into the first fluid cooling passage. The plurality of ribs are distributed about the fluid cooling passage as an array of ribs. The rail is disposed at the plurality of ribs. The rail extends about the fluid cooling passage. The side plate is positioned between and contacting the rail and the rotor housing body.

In any of the aspects or embodiments described above and herein, the rotor housing body may form a second fluid cooling passage connected in fluid communication with the first fluid cooling passage.

In any of the aspects or embodiments described above and herein, the side housing body and the rail may form a plurality of fluid cooling channels connected in fluid communication with the first fluid cooling passage.

In any of the aspects or embodiments described above and herein, the plurality of fluid cooling channels may connect the second fluid cooling passage in fluid communication with the first fluid cooling passage.

In any of the aspects or embodiments described above and herein, each fluid cooling channel of the plurality of fluid cooling channels may be formed by adjacent ribs of the plurality of ribs.

The present disclosure, and all its aspects, embodiments and advantages associated therewith will become more readily apparent in view of the detailed description provided below, including the accompanying drawings.

DETAILED DESCRIPTION

Figure 1:
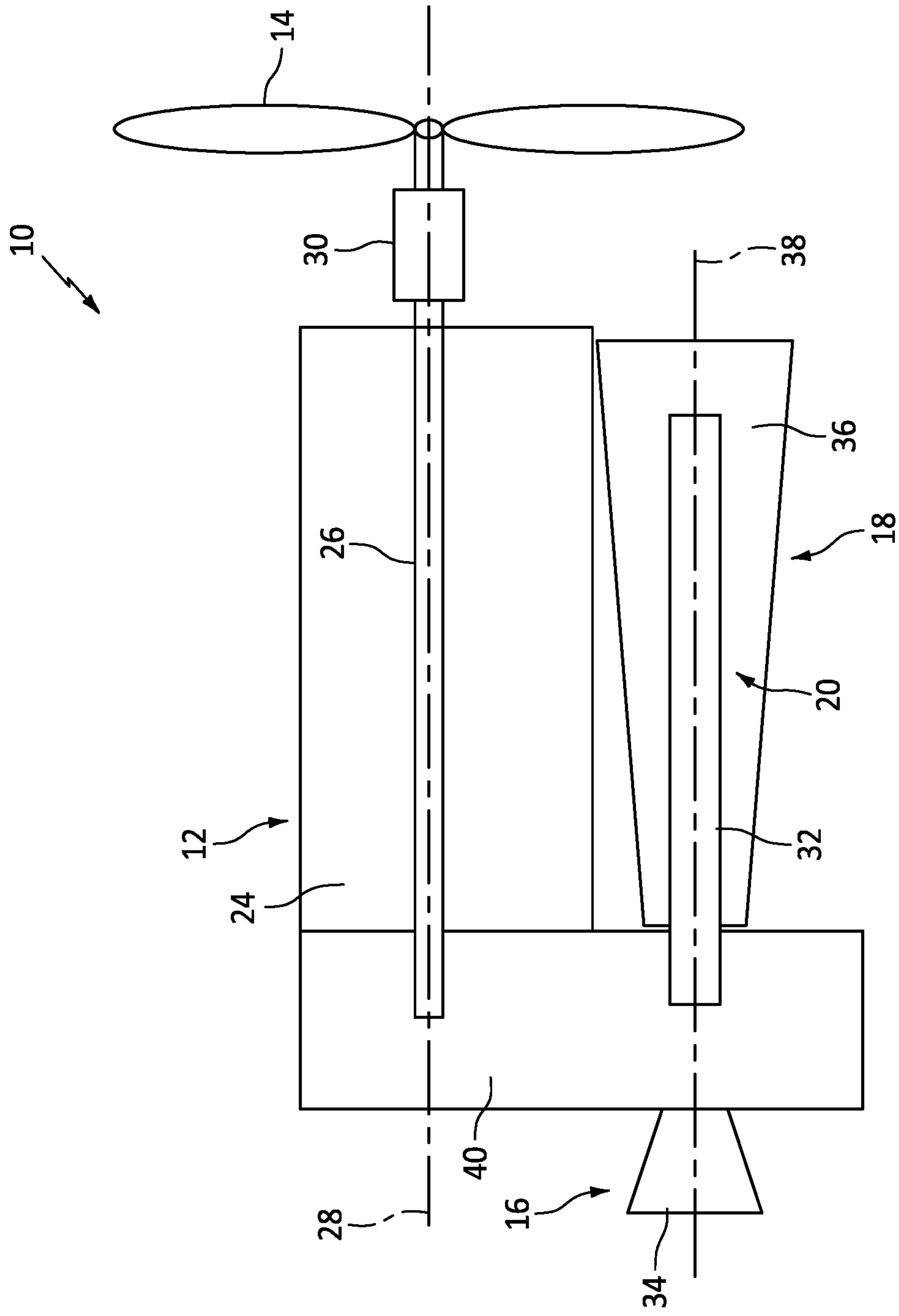
FIG. 1 illustrates a schematic view of an engine assembly, in accordance with one or more embodiments of the present disclosure.

FIG. 1 illustrates an engine assembly 10. The engine assembly 10 may form a portion of a propulsion system for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The engine assembly 10 may also form a portion of an auxiliary power unit (APU) or onboard generator for an aircraft. However, the present disclosure is not limited to any particular application of the engine assembly 10. The engine assembly 10 of FIG. 1 includes an engine 12, a rotational load 14, a compressor section 16, a turbine section 18, a rotational assembly 20, and an engine control system 22.

The engine 12 of FIG. 1 is configured as a rotary intermittent internal combustion engine, which intermittent internal combustion engine includes a rotor assembly 24 and an engine shaft 26. As will be described in further detail, the rotor assembly 24 may be configured, for example, as a Wankel engine in which an eccentric rotor configuration is used to convert fluid pressure into rotational motion.

The rotor assembly 24 is coupled to the engine shaft 26 and configured to drive the engine shaft 26 for rotation about a rotational axis 28. The engine shaft 26 is coupled to the rotational load 14 such that rotation of the engine shaft 26 by the rotor assembly 24 drives rotation of the rotational load 14. The engine shaft 26 may be coupled to the rotational load 14 by a speed-reducing gear assembly 30 of the engine 12. The speed-reducing gear assembly 30 may be configured to effect rotation of the rotational load 14 at a reduced rotational speed relative to the engine shaft 26. The rotational load 14 of FIG. 1 is configured as a propeller. Rotation of the propeller by the engine 12 may generate thrust for an aircraft which includes the engine assembly 10. The engine assembly 10 of the present disclosure may additionally or alternatively be configured to drive other rotational loads, such as, but not limited to, an electrical generator(s), a rotational accessory load, a rotor mast, a compressor, or any other suitable rotational load configuration.

The rotational assembly 20 of FIG. 1 includes a shaft 32, a bladed compressor rotor 34 of the compressor section 16, and a bladed turbine rotor 36 of the turbine section 18. The shaft 32 interconnects the bladed compressor rotor 34 and the bladed turbine rotor 36. The shaft 32, the bladed compressor rotor 34, and the bladed turbine rotor 36 are mounted to rotation about a rotational axis 38. Ambient air is received by the compressor section 16. The air is compressed by rotation of the bladed compressor rotor 34 and directed to an air intake of the engine 12. Combustion exhaust gases from the engine 12 are directed to the turbine section 18 causing the bladed turbine rotor 36 to rotate and rotationally drive the rotational assembly 20. The engine shaft 26 and the rotational assembly 20 may be rotatably coupled by a gearbox 40 of the engine assembly 10, thereby allowing the engine 12 and/or the bladed turbine rotor 36 to rotationally drive the bladed compressor rotor 34. The present disclosure, however, is not limited to the particular engine 12 and rotational assembly 20 configuration of FIG. 1.

Figure 2:
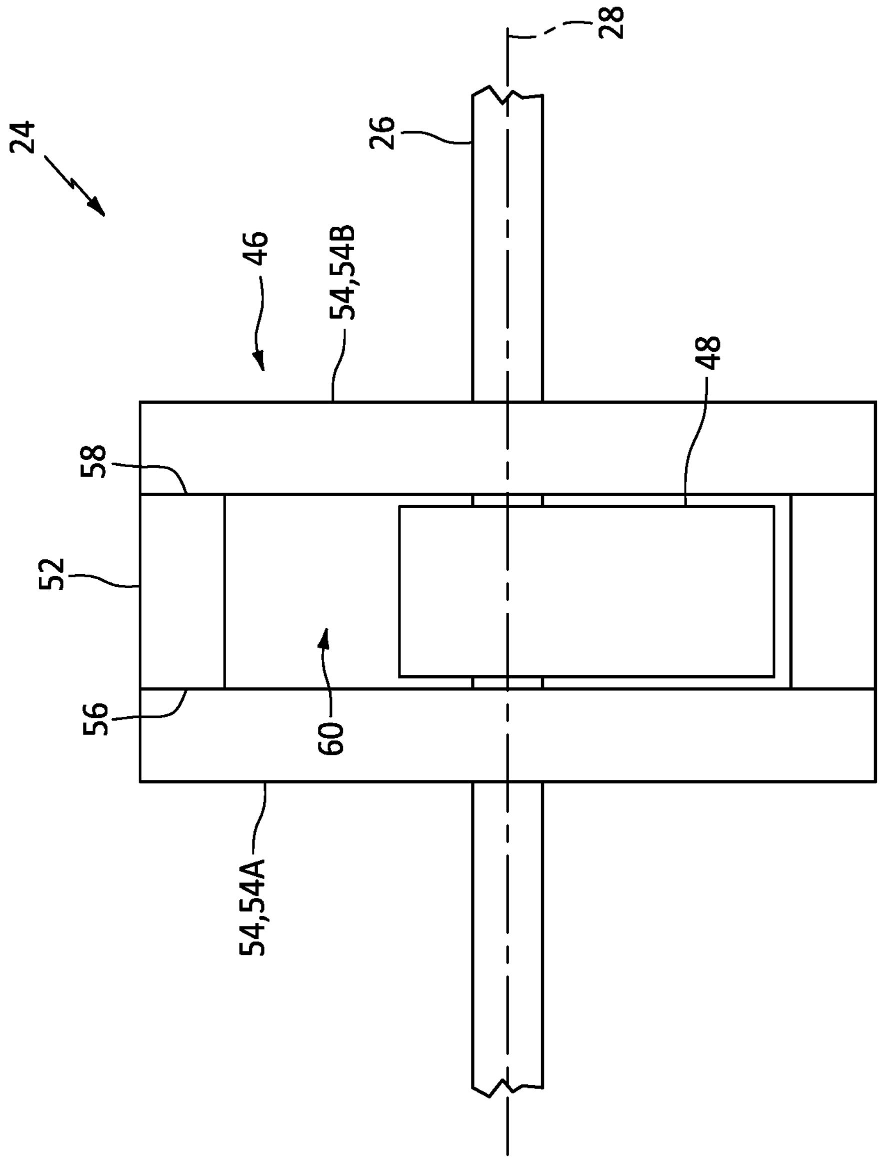
FIG. 2 illustrates a cutaway view of a rotor assembly for the engine assembly of FIG. 1 with additional portions of the engine assembly schematically illustrated, in accordance with one or more embodiments of the present disclosure.
Figure 3:
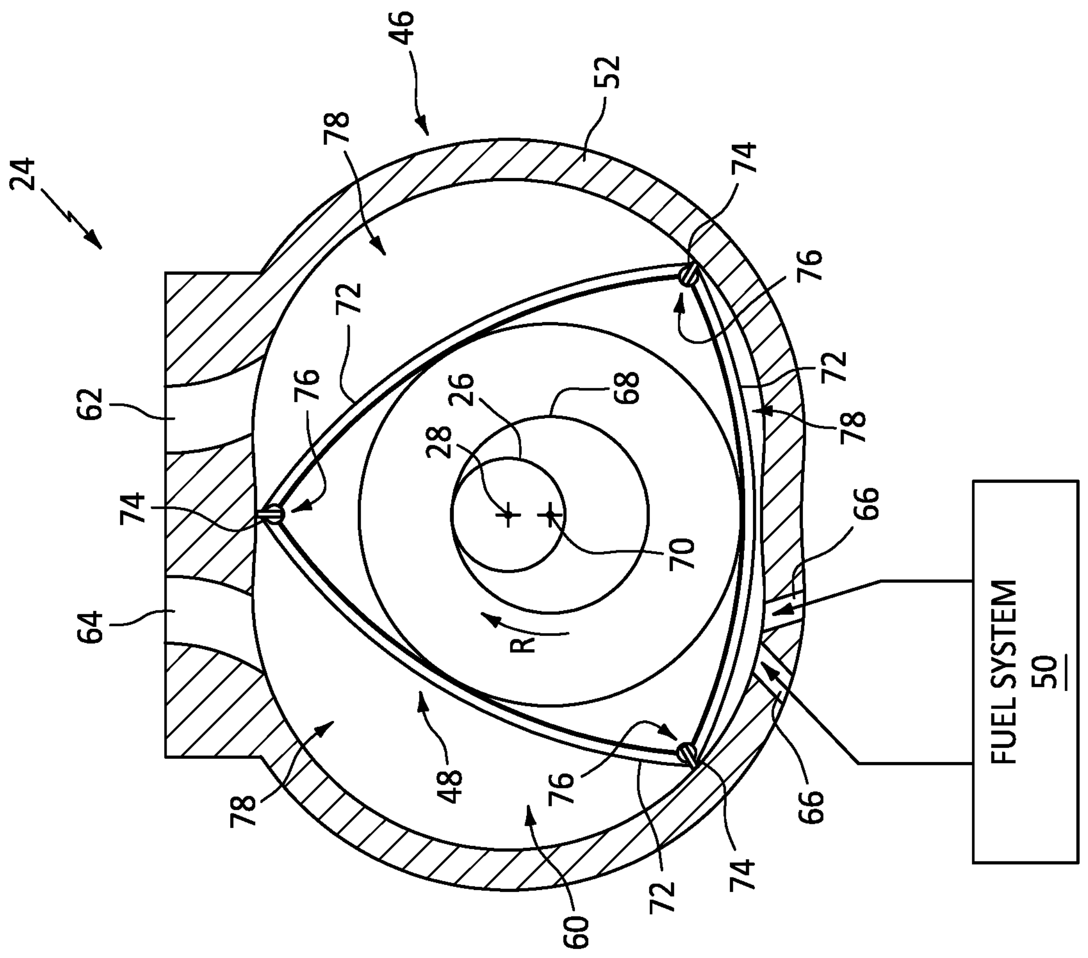
FIG. 3 illustrates a cutaway axial view of a rotor assembly for the engine assembly of FIG. 1, in accordance with one or more embodiments of the present disclosure.

Referring to FIGS. 2 and 3, the rotor assembly 24 includes a rotor housing 46, one or more rotors 48, and a fuel system 50. FIG. 2 illustrates a side, cutaway view of the rotor assembly 24. FIG. 3 illustrates a cutaway view of the rotor assembly 24 at an axial position relative to the rotational axis 28. The rotor assembly 24 of FIG. 2 includes a single rotor 48, however, the present disclosure is not limited to any particular number of rotors 48 for the rotor assembly 24. For example, the rotor assembly 24 may alternatively include a plurality of rotors 48.

The rotor housing 46 of FIGS. 2 and 3 includes a rotor housing body 52 and opposing side housing assemblies 54. The rotor housing body 52 may extend (e.g., axially extend) between and to a first end 56 of the rotor housing body 52 and a second end 58 of the rotor housing body 52. The rotor housing body 52 may extend about (e.g., completely around) the rotational axis 28. The side housing assemblies 54 may be mounted to or otherwise disposed at (e.g., on, adjacent, or proximate) the first end 56 and the second end 58. For example, the side housing assemblies 54 may include a first side housing assembly 54A disposed at the first end 56 and a second side housing assembly 54B disposed at the second end 58. Each of the first side housing assembly 54A and the second side housing assembly 54B may include a respective shaft aperture (not shown) through which the engine shaft 26 may extend along the rotational axis 28. The rotor housing body 52 and the side housing assemblies 54 form a rotor cavity 60 of the rotor assembly 24.

FIG. 3 illustrates the rotor housing body 52 surrounding and forming the rotor cavity 60. The rotor cavity 60 of FIG. 3 is formed with two lobes, which two lobes may collectively be configured with an epitrochoid shape. The rotor housing body 52 further forms an intake port 62, an exhaust port 64, and one or more fuel system passages 66. The intake port 62 is in fluid communication with the rotor cavity 60. The intake port 62 is configured to direct compressed air to the rotor cavity 60, for example, from the compressor section 16 (see FIG. 1). The exhaust port 64 is in fluid communication with the rotor cavity 60. The exhaust port 64 is configured to direct combustion exhaust gas out of the rotor cavity 60. For example, the exhaust port 64 may be configured to direct the combustion exhaust gas from the rotor cavity 60 to the turbine section 18 (see FIG. 1). The fuel system passages 66 provide access to the rotor cavity 60 for a spark plug or other ignition device and/or for one or more fuel injectors of a fuel system 50.

The rotor 48 of FIGS. 2 and 3 is coupled to an eccentric portion 68 of the engine shaft 26. The rotor 48 is disposed within the rotor cavity 60. The rotor 48 is configured to rotate (e.g., in rotation direction R) with the eccentric portion 68 about a rotational axis 70 of the rotor 48 to perform orbital revolutions within the rotor cavity 60. The rotational axis 70 may be offset from and parallel to the rotational axis 28.

Briefly, the rotor 48 of FIG. 3 includes three sides 72 and three apex seals 74. The sides 72 of the rotor 48 form a generally triangular cross-sectional shape of the rotor 48 (e.g., along a plane extending perpendicular to the rotational axis 70). The sides 72 may be configured with a convex curvature, which convex curvature faces away from the rotational axis 70. Each side 72 intersects each other side 72 at an apex portion 76 of the rotor 48. Each apex seal 74 is disposed at a respective one of the apex portions 76. Each apex portion 76 may include a slot, channel, or other attachment configuration for retaining a respective apex seal 74. Each apex seal 74 extends outward (e.g., radially outward) from each respective apex portion 76 toward the rotor housing body 52. The apex seals 74 may be configured as spring-loaded seals, which spring-loaded seals may be biased toward an outer radial position. Each apex seal 74 is configured to sealingly contact the rotor housing body 52, thereby forming three separate working chambers 78 of variable volume between the rotor 48 and the rotor housing body 52.

In operation of the engine 12, the fuel system 50 is configured to effect rotation of the rotor 48 by directing a fuel into the rotor cavity 60 and igniting the fuel in a defined sequence. During each orbital revolution of the rotor 48, each working chamber 78 varies in volume and moves about the rotor cavity 60 to undergo four phases of intake, compression, expansion, and exhaust.

Figure 4:
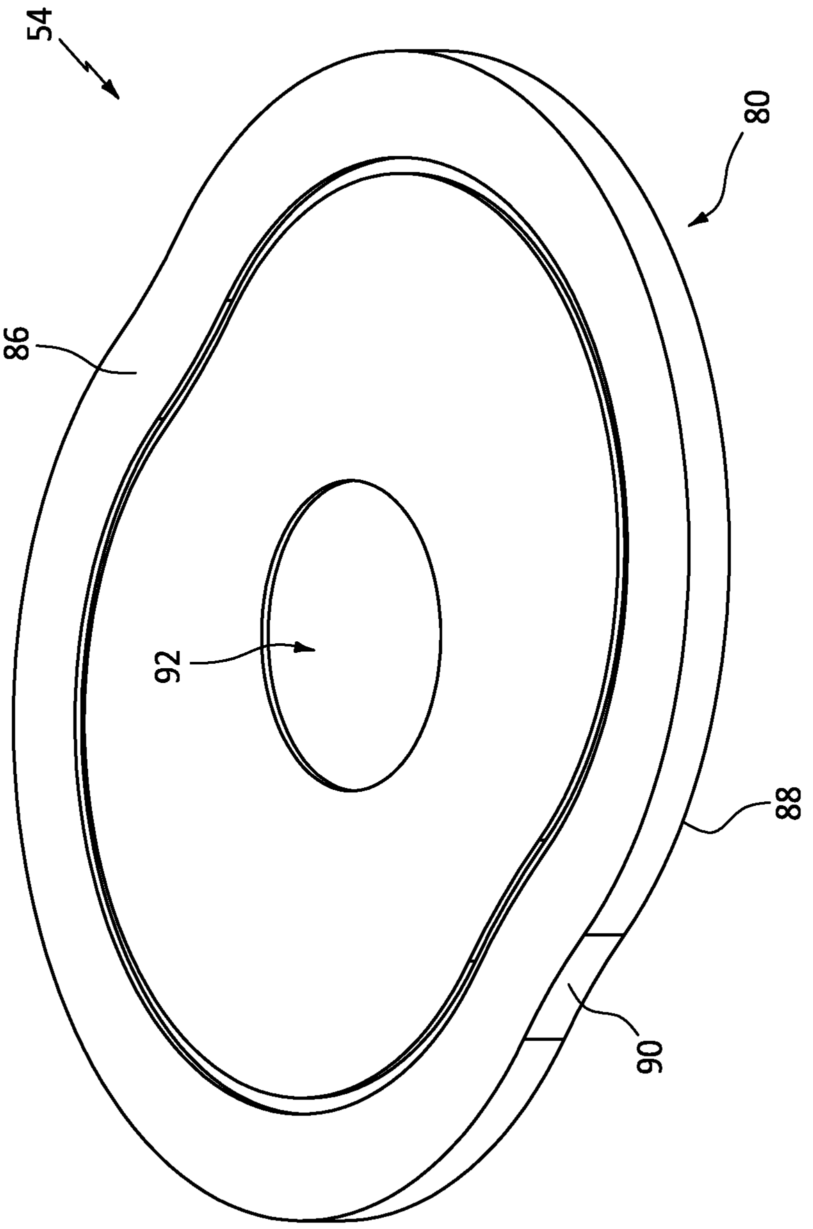
FIG. 4 illustrates a perspective view of a side plate for a rotor housing, in accordance with one or more embodiments of the present disclosure.
Figure 5:
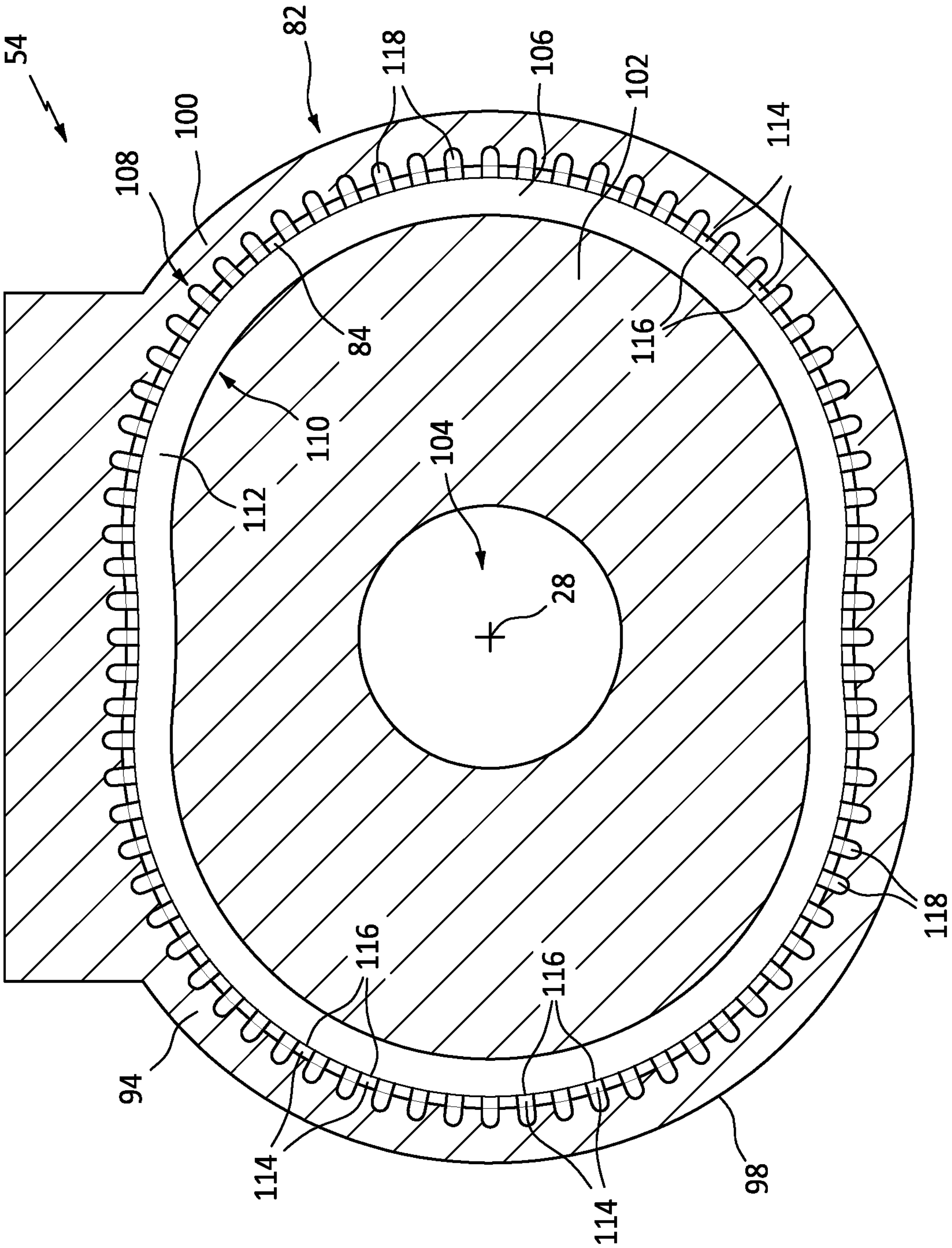
FIG. 5 illustrates a side view of a side housing body and rail for a rotor housing, in accordance with one or more embodiments of the present disclosure.
Figure 7:
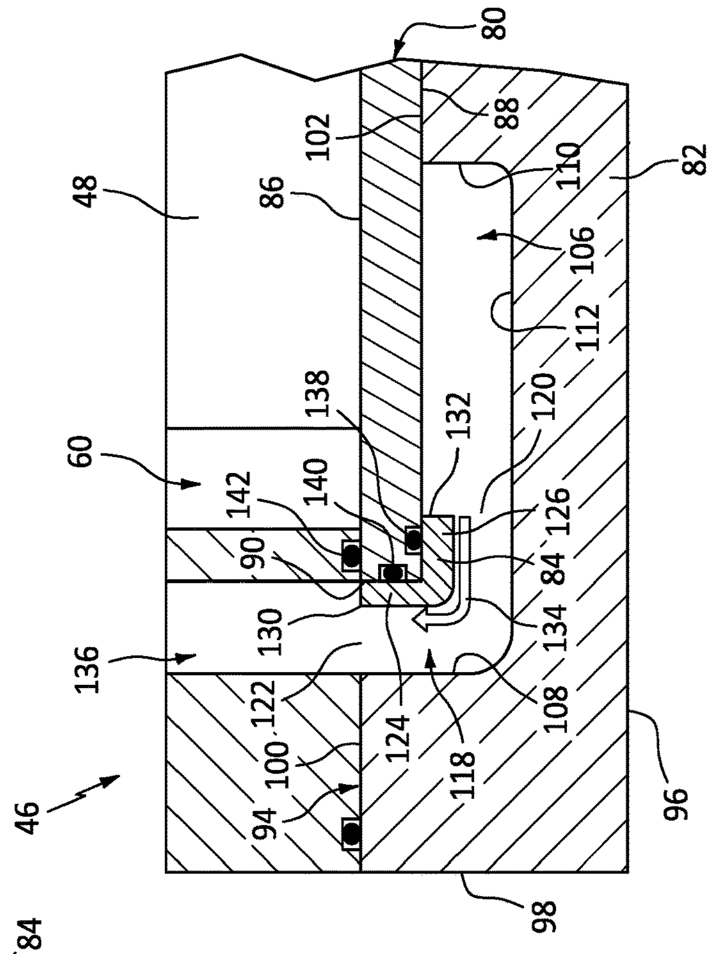
FIG. 7 illustrates a cutaway view of a portion of the rotor housing, in accordance with one or more embodiments of the present disclosure.
Figure 6:
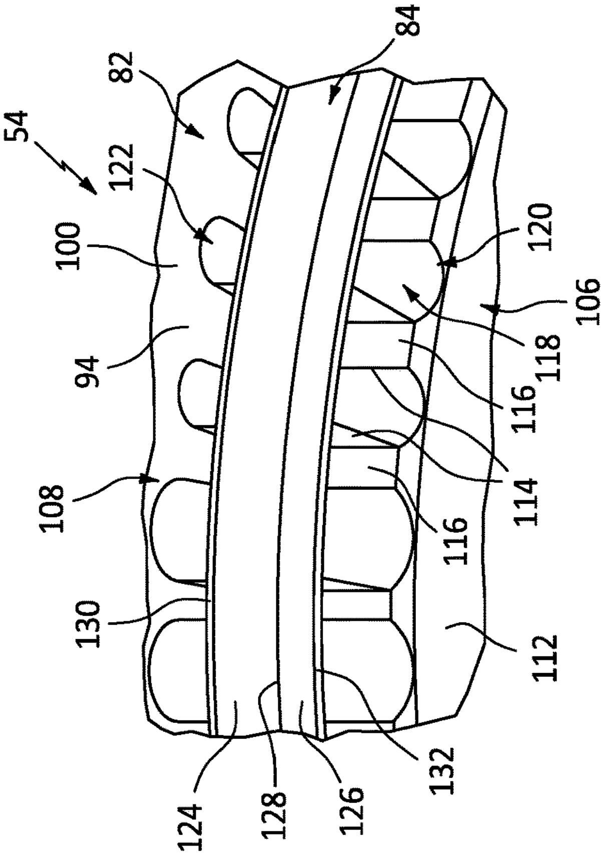
FIG. 6 illustrates a perspective view of a portion of the side housing body and the rail of FIG. 5, in accordance with one or more embodiments of the present disclosure.

Referring to FIGS. 4-7, the rotor housing 46 will be described in greater detail. In particular, the side housing assemblies 54 (e.g., each of the side housing assemblies 54A, 54B) includes a side plate 80, a side housing body 82, and a rail 84. FIG. 4 illustrates a perspective view of the side plate 80. FIG. 5 illustrates a side view of the side housing body 82 and the rail 84. FIG. 6 illustrates a perspective view of the side housing body 82 and the rail 84. FIG. 7 illustrates a cutaway view of the assembled rotor housing 46 including the rotor housing body 52 and the components 80, 82, 84 of one of the side housing assemblies 54.

The side plate 80 extends (e.g., axially extends relative to the rotational axis 28) between and to an inner side 86 of the side plate 80 and an outer side 88 of the side plate 80. The side plate 80 includes a perimeter edge 90 circumscribing the inner side 86 and the outer side 88. The side plate 80 (e.g., the perimeter edge 90) may have an epitrochoid shape similar to that of the rotor cavity 60. As shown in FIG. 7, for example, the inner side 86 forms a portion of the rotor cavity 60. The side plate 80 forms a shaft aperture 92 for the engine shaft 26 (see FIGS. 1-3). The shaft aperture 92 extends through the side plate 80 from the inner side 86 to the outer side 88. The side plate 80 includes a side plate material. The side plate material may form all or a substantial portion of the side plate 80. The side plate material may be metal such as alloy steel, aluminum, or the like. The side plate material may alternatively be a composite material such as, but not limited to, silicon carbide (SIC). The present disclosure, however, is not limited to the use of a particular material or combination of materials for the side plate material.

The side housing body 82 extends (e.g., axially extends relative to the rotational axis 28) between and to an inner side 94 of the side housing body 82 and an outer side 96 of the side housing body 82. The side housing body 82 includes a perimeter edge 98 circumscribing the inner side 94. The inner side includes a first side portion 100 and a second side portion 102. The first side portion 100 is disposed at (e.g., on, adjacent, or proximate) the perimeter edge 98. The second side portion 102 is disposed inward (e.g., radially inward) of the first side portion 100. The second side portion 102 is recessed (e.g., axially spaced) relative to the first side portion 100 to accommodate the side plate 80 (see FIG. 7). The second side portion 102 is positioned in contact with or is otherwise disposed at (e.g., on, adjacent, or proximate) the side plate 80 (e.g., the outer side 88). The side housing body 82 forms a shaft aperture 104 for the engine shaft 26 (see FIGS. 1-3). The shaft aperture 104 extends through the side housing body 82 from the inner side 94 (e.g., the second side portion 102) to the outer side 96. The side housing body 82 includes a side housing body material. The side housing body material may form all or a substantial portion of the side housing body 82. The side housing body material may be different than the side plate material. For example, the side housing body material may be a softer material relative to the side plate material (i.e., the side plate material may be harder than the side housing body material). The side housing body material may be metal such as, but not limited to aluminum. The present disclosure, however, is not limited to the use of a particular material or combination of materials for the side housing body material.

The side housing body 82 forms a fluid cooling passage 106 on the inner side 94. The fluid cooling passage 106 is disposed between and separates the first side portion 100 and the second side portion 102. The fluid cooling passage 106 extends about (e.g., completely around) the rotational axis 38. The fluid cooling passage 106 may have an epitrochoid shape similar to that of the side plate 80. The fluid cooling passage 106 is formed by a portion of the side housing body 82 recessed from the inner side 94 (e.g., the first side portion 100 and the second side portion 102). For example, the fluid cooling passage 106 of FIGS. 5-7 includes an outer radial side 108, an inner radial side 110, and an outer axial side 112 formed by the side housing body 82. The outer radial side 108, the inner radial side 110, and the outer axial side 112 extend about (e.g., completely around) the rotational axis 38. The outer radial side 108 and the inner radial side 110 extend (e.g., axially extend) between the inner side 94 and the outer axial side 112. For example, the outer radial side 108 of FIGS. 5-7 extends between and to the first side portion 100 and the outer axial side 112 and the inner radial side 110 of FIGS. 5-7 extends between and to the second side portion 102 and the outer axial side 112. The fluid cooling passage 106 is further formed by the outer side 88 (see FIG. 7). The fluid cooling passage 106 may be connected in fluid communication with a fluid inlet and a fluid outlet (not shown) for the rotor housing 46. For example, the first side housing assembly 54A (see FIG. 2) may include or otherwise form a fluid inlet for the fluid cooling passage 106 and the second side housing assembly 54B (see FIG. 2) may include or otherwise form a fluid outlet for the fluid cooling passage 106. A fluid cooling system (not shown) may direct a cooling fluid through the rotor housing 46 (e.g., through the first side housing assembly 54A, the rotor housing body 52 and the second side housing assembly 54B) from the fluid inlet to the fluid outlet. The present disclosure, however, is not limited to any particular suitable configuration of the fluid inlet, the fluid outlet, or the fluid supply system, which suitable configuration may be selected or determined by a person of ordinary skill in the art in accordance with and as informed by one or more aspects of the present disclosure.

The side housing body 82 further forms a plurality of ribs 114 coincident with the fluid cooling passage 106. Each of the ribs 114 extends (e.g., radially extends) into the fluid cooling passage 106 from the outer radial side 108 to a distal end 116 of the respective rib 114. Each of the ribs 114 extends from the outer radial side 108 toward the inner radial side 110 with the distal end 116 spaced (e.g., radially spaced) from the inner radial side 110. Each of the ribs 114 extends along the outer axial side 112. Each of the ribs 114 may extend along and form a portion of the inner side 94 (e.g., the first side portion 100). The ribs 114 may extend about (e.g., completely around) the fluid cooling passage 106. For example, the ribs 114 may be distributed about the fluid cooling passage 106 as an array (e.g., an epitrochoid array) of the ribs 114. Each rib 114 may be spaced (e.g., circumferentially spaced) from each adjacent rib 114 to form a fluid cooling channel 118 (collectively a plurality of fluid cooling channels 118) between the adjacent ribs 114. The side housing body 82 and its plurality of ribs 114 form a channel inlet 120 and a channel outlet 122 of each fluid cooling channel 118. The channel inlet 120 may be disposed at (e.g., on, adjacent, or proximate) the distal ends 116 of adjacent ribs 114. The channel inlet 120 may be disposed coincident with the fluid cooling passage 106. The channel outlet 122 may be disposed at (e.g., on, adjacent, or proximate) the inner side 94 (e.g., the first side portion 100). Each fluid cooling channel 118 may be disposed in fluid communication with the fluid cooling passage 106 to direct a fluid (e.g., water) from the fluid cooling passage 106 through each fluid cooling channel 118 from the channel inlet 120 to the channel outlet 122.

The rail 84 extends about (e.g., completely around) the rotational axis 38 coincident with the fluid cooling passage 106. The rail 84 may be mounted to, formed with, or otherwise disposed at (e.g., on, adjacent, or proximate) each of the plurality of ribs 114. The rail 84 forms a portion of each of the fluid cooling channels 118. The rail 84 includes an axially-extending portion 124 and a radially-extending portion 126. Each of the axially-extending portion 124 and the radially-extending portion 126 extend about (e.g., completely around) the rotational axis 38. The axially-extending portion 124 intersects the radially-extending portion 126 at a rail interface 128. The rail interface 128 may form an orthogonal or substantially orthogonal intersection of the axially-extending portion 124 and the radially-extending portion 126. The axially-extending portion 124 extends (e.g., axially extends) from the rail interface 128 to an axial end 130 at (e.g., on, adjacent, or proximate) the inner side 86 (e.g., the first side portion 100). In other words, the axially-extending portion 124 may extend from the radially-extending portion 126 to the axial end 130. Accordingly, the radially-extending portion 126 is recessed (e.g., axially spaced) relative to the first side portion 100 to accommodate the side plate 80 (see FIG. 7). The axial end 130 may form a portion of the channel outlet 122 for each fluid cooling channel 118. The radially-extending portion 126 extends (e.g., radially extends) from the rail interface 128 to a radial end 132 at (e.g., on, adjacent, or proximate) the distal end 116 for each of the plurality of ribs 114. In other words, the radially-extending portion 126 may extend from the axially-extending portion 124 to the radial end 132. The radial end 132 may form a portion of the channel inlet 120 for each fluid cooling channel 118.

Referring to FIG. 7, the rotor housing body 52 and the components 80, 82, 84 of one of the side housing assemblies 54 are shown. The side plate 80 is disposed with the outer side 88 at (e.g., on, adjacent, or proximate) the radially-extending portion 126, the perimeter edge 90 at (e.g., on, adjacent, or proximate) the axially-extending portion 124, and the inner side 86 at (e.g., on, adjacent, or proximate) the rotor housing body 52. Fluid (e.g., water) 134 is directed through the fluid cooling passage 106 and the fluid cooling channels 118 to facilitate cooling of the side plate 80 and the side housing body 82. The rotor housing body 52 may form a fluid cooling passage 136 connected in fluid communication with the fluid cooling channels 118 (e.g., the channel outlets 122). Accordingly, the fluid 134 may further facilitate cooling of the rotor housing body 52.

The rotor housing 46 may include one or more seals (e.g., annular seals, O-rings, etc.) between the side plate 80 and the rail 84 and/or between the side plate 80 and the rotor housing body 52. For example, the rotor housing 46 may include a seal 138 between the outer side 88 and the radially-extending portion 126, a seal 140 between the perimeter edge 90 and the axially-extending portion 124, and/or a seal 142 between the inner side 86 and the rotor housing body 52. The present disclosure, however, is not limited to the particular configuration of the seals 138, 140, 142 illustrated in FIG. 7. The rail 84 provides a continuous support surface of the side plate 80 about the epitrochoid rotor cavity 60 while facilitating cooling fluid 134 flow through the rotor housing 46. The rail 84 facilitates improved sealing between the fluid cooling passage 106 and the rotor cavity 60 by providing a continuous sealing surface, for example, for the seals 138 and/or 140 of FIG. 7. The continuous sealing surface formed by the rail 84 for the seals 138 and/or 140 allows the seals 138 and/or 140 to be positioned further from the hot combustion gases of the rotor cavity 60 (e.g., in comparison to the seal 142) while still allowing the seals 138 and/or 140 to form a continuous seal (e.g., completely around the side plate 80) between the side plate 80 and the side housing body 82. Accordingly, the continuous sealing surface formed by the rail 84 may facilitate a reduction in the likelihood of seal 138, 140 degradation and/or failure due to exposure to hot combustion gases. The continuous support and sealing surface formed by the rail 84 may additionally facilitate a reduction in wear which may be caused by movement of the side plate 80 against a relatively softer side housing body 82 (e.g., wear which may be caused by a relatively harder side plate 80 material to a relatively softer side housing body 82 material).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently.

In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A rotor housing for an aircraft rotary engine, the rotor housing comprising:

a side housing body extending along an axis between and to an inner axial housing side and an outer axial housing side, the side housing body forming a fluid cooling passage and a plurality of ribs, the fluid cooling passage extending about the axis at the inner axial housing side, the plurality of ribs coincident with and extending into the fluid cooling passage, the plurality of ribs distributed about the fluid cooling passage as an array of ribs;

a rail disposed at the plurality of ribs, the rail extending axially between and to the plurality of fluid cooling channels and the inner axial housing side, the rail extending about the fluid cooling passage; and a side plate including an inner axial plate side, an outer axial plate side, and a perimeter edge, the perimeter edge disposed at the rail;

the side housing body and the rail forming a plurality of fluid cooling channels connected in fluid communication with the fluid cooling passage, the outer axial plate side further forming the fluid cooling passage at the plurality of fluid cooling channels.

2. The rotor housing of claim 1, wherein each fluid cooling channel of the plurality of fluid cooling channels includes a channel inlet and the channel inlet is disposed at the fluid cooling passage.

3. The rotor housing of claim 1, wherein each fluid cooling channel of the plurality of fluid cooling channels includes a channel outlet and the channel outlet is disposed at the inner axial housing side.

4. The rotor housing of claim 1, wherein each fluid cooling channel of the plurality of fluid cooling channels is formed by adjacent ribs of the plurality of ribs.

5. The rotor housing of claim 1, wherein the side housing body forms an outer radial passage side, an inner radial passage side, and an outer axial passage side of the fluid cooling passage, the outer radial passage side and the inner radial passage side extending between and to the inner axial housing side and the outer axial passage side.

6. The rotor housing of claim 5, wherein each rib of the plurality of ribs extends from the outer radial passage side into the fluid cooling passage.

7. The rotor housing of claim 5, wherein the rail includes an axially-extending portion and a radially-extending portion, the axially-extending portion extending from the radially-extending portion to the inner axial housing side.

8. The rotor housing of claim 7, wherein the radially-extending portion extends from the axially-extending portion to a distal end of each rib of the plurality of ribs.

9. A rotary engine assembly for an aircraft, the rotary engine assembly comprising:

a rotatable engine shaft extending along a rotational axis;

a rotor coupled to an eccentric portion of the rotatable engine shaft; and a rotor housing surrounding and forming a rotor cavity for the rotor, the rotor housing including:

a side housing body forming a fluid cooling passage and a plurality of ribs, the fluid cooling passage extending about the rotational axis, the plurality of ribs coincident with and extending into the fluid cooling passage;

a rail disposed at the plurality of ribs, the rail extending about the fluid cooling passage; and a side plate including an inner axial plate side, an outer axial plate side, and a perimeter edge, the perimeter edge disposed at the rail, the inner axial plate side forming a portion of the rotor cavity;

wherein the side housing body and the rail form a plurality of fluid cooling channels connected in fluid communication with the fluid cooling passage with the rail disposed axially between the outer axial plate side and each fluid cooling channel of the plurality of fluid cooling channels, the outer axial plate side further forming the fluid cooling passage at the plurality of fluid cooling channels.

10. The rotary engine assembly of claim 9, wherein the rotatable engine shaft extends through the side housing body and the side plate along the rotational axis.

11. The rotary engine assembly of claim 9, wherein the rotor housing further includes a seal disposed between the rail and the side plate.

12. The rotary engine assembly of claim 9, wherein the outer axial plate side further forms the fluid cooling passage.

13. The rotary engine assembly of claim 9, wherein the side housing body and the rail form a channel inlet and a channel outlet for each fluid cooling channel of the plurality of fluid cooling channels.

14. The rotary engine assembly of claim 9, wherein the rail includes an axially-extending portion and a radially-extending portion, the perimeter edge disposed at the axially-extending portion and the outer axial plate side disposed at the radially-extending portion.

15. A rotor housing for an aircraft rotary engine, the rotor housing comprising:

a rotor housing body disposed about an axis, the rotor housing body extending between and to a first axial end and a second axial end;

a side housing body disposed at the first axial end, the side housing body forming a first fluid cooling passage and a plurality of ribs, the first fluid cooling passage extending about the axis, the plurality of ribs coincident with and extending into the first fluid cooling passage, the plurality of ribs distributed about the first fluid cooling passage as an array of ribs;

a rail disposed at the plurality of ribs, the rail extending about the first fluid cooling passage; and a side plate positioned between and contacting the rail and the rotor housing body, the side plate including an inner axial plate side, an outer axial plate side, and a perimeter edge, the perimeter edge disposed at the rail;

wherein the side housing body and the rail form a plurality of fluid cooling channels connected in fluid communication with the first fluid cooling passage, and the rail extends axially between and to the plurality of fluid cooling channels and the side plate, the outer axial plate side further forming the fluid cooling passage at the plurality of fluid cooling channels.

16. The rotor housing of claim 15, wherein the rotor housing body forms a second fluid cooling passage connected in fluid communication with the first fluid cooling passage.

17. The rotor housing of claim 16, wherein the plurality of fluid cooling channels connect the second fluid cooling passage in fluid communication with the first fluid cooling passage.

18. The rotor housing of claim 16, wherein each fluid cooling channel of the plurality of fluid cooling channels is formed by adjacent ribs of the plurality of ribs.

* * * * *